March 22, 1966 F. P. KEIPER, JR 3,242,259
SYSTEM TO MINIMIZE DESATURATION AND REDUCE NOISE IN COLOR TV PICTURE BY SUBTRACTING FROM LUMINANCE SIGNAL A D.C. SIGNAL DERIVED FROM CHROMINANCE SIGNAL VIA A FORWARD BIASED UNILATERALLY CONDUCTIVE DEVICE
Filed March 31, 1961
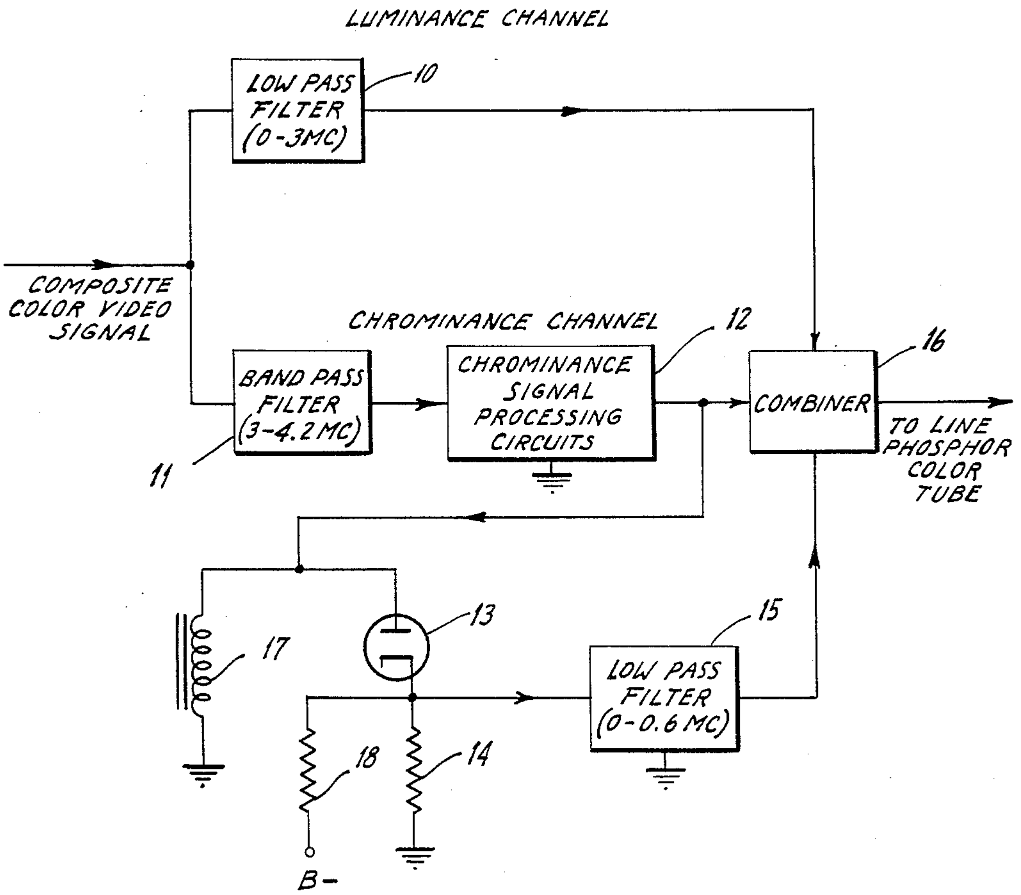
INVENTOR.
FRANCIS P. KEIPER, Jr.
BY
Allen V. Hazeltine
ATTORNEY United States Patent Office 3,242,259
Patented Mar. 22, 1966

3,242,259

SYSTEM TO MINIMIZE DESATURATION AND REDUCE NOISE IN COLOR TV PICTURE BY SUBTRACTING FROM LUMINANCE SIGNAL A D.C. SIGNAL DERIVED FROM CHROMINANCE SIGNAL VIA A FORWARD BIASED UNILATERALLY CONDUCTIVE DEVICE

Francis P. Keiper, Jr., Oreland, Pa., assignor, by mesne assignments, to Philco Corporation, Philadelphia, Pa., a corporation of Delaware Filed Mar. 31, 1961, Ser. No. 99,811
8 Claims. (Cl. 178—5.4)

This invention relates to improvements in color television receivers, and in particular to improvements in the noise performance of color television receivers employing line phosphor type color picture tubes.

In color television receivers employing picture reproducing tubes of the line phosphor type supplied with a composite color television signal of conventional form comprising a luminance component occupying a low frequency range and a chrominance component consisting of a carrier wave modulated in amplitude and phase by color information and occupying a higher frequency range, desaturation of the reproduced picture may result because the intensity of the electron beam of the tube is not maintained at the value required for correct reproduction of a particular color during the entire time that the beam impinges on a phosphor element emissive of that color. As explained in U.S. Patent No. 2,969,426, granted January 24, 1961 to Stephen W. Moulton, such desaturation can be minimized by reducing the amplitude of the luminance component of the composite signal supplied to the picture tube by an amount proportional to the amplitude of the chrominance component. To achieve this result, as taught by Moulton, in a color television receiver provided with separate luminance and chrominance channels a circuit is provided in shunt with the chrominance signal channel including a unilaterally conductive device and suitable load impedance therefor for developing a rectified signal proportional to the amplitude of the chrominance component. The rectified signal is filtered to derive components in the luminance frequency range which are then subtracted from the luminance signal and the resultant signal supplied to the color picture tube.

The unilaterally conductive device employed in accordance with Moulton's teaching will generally present a higher impedance for chrominance signals of low amplitude than for chrominance signals of higher amplitude, as a result of which the gain in the chrominance signal channel will be increased for low amplitude signals over its gain for signals of higher amplitude. This is undesirable because it increases the deleterious effects of noise on the reproduced picture during monochrome reception when the effects of noise are most noticeable, producing undesired areas of color in low luminance areas which are particularly objectionable.

Accordingly an object of the invention is to provide means for minimizing the effects of noise in color television receivers employing line phosphor type picture display tubes.

More particularly it is an object of the invention to provide means for reducing the adverse effects of noise on color television receivers employing picture display tubes of the line phosphor type during monochrome reception and during reception of signals with low chroma content.

These objects and others which will appear are achieved by biasing a unilaterally conductive device included in a path in shunt with the chrominance channel of a color television receiver so as to maintain the device conductive even for very low amplitudes of the chrominance signal component. In this manner the impedance of the shunt path is reduced for chrominance signals of low amplitude so as to prevent increase in the gain of the chrominance signal channel for such signals. More particularly, in a preferred embodiment of the invention, the unilaterally conductive device is so biased that the impedance presented by the shunt path for chrominance signals of low amplitude is less than the impedance presented for signals of high amplitude. Thus the gain of the chrominance signal channel for chrominance signals of low amplitude is made less than for chrominance signals of high amplitude and the effects of noise during monochrome reception and during reception of signals of low chroma content are minimized.

The invention will be fully understood from the following description of a preferred embodiment illustrated in the single figure of the drawing.

The drawing illustrates the pertinent portions of a color television receiver employing a line phosphor type color display tube having separate luminance and chrominance channels and including a path in shunt with the chrominance signal channel, said path including a unilaterally conductive device and a load impedance therefor for developing a signal proportional to the amplitude of the chrominance signal. The developed signal is then combined with the chrominance and luminance signals for application to the line phosphor type color display tube to minimize desaturation of the reproduced picture in accordance with the teaching of the Moulton patent above referred to.

A composite color video signal of conventional form, comprising chrominance and luminance signal components of the sort hereinbefore mentioned, is derived from any suitable point in a conventional color television receiver—e.g. the output of the second detector—and is separated into its respective luminance and chrominance components by low pass filter 10 in the luminance channel and bandpass filter 11 in the chrominance channel. The chrominance signal appearing in the output of bandpass filter 11, which may comprise a 3.58 mc. modulated carrier wave, is supplied to conventional signal processing circuits 12 which operate to convert it to a modulated carrier of different frequency (e.g. 7 mc.) suitable for use with a typical line phosphor type color tube, and which also may provide amplification.

Unilaterally conductive device 13 and resistor 14 comprise a path connected in shunt with the chrominance signal channel at the output of processing circuits 12 for developing across resistor 14 a rectified signal proportional to the amplitude of the chrominance signal. The components of this rectified signal lying within the luminance signal band (0–3 mc.) are selected by low pass filter 15 and are combined in combiner 16 with the luminance signal appearing at the output of low pass filter 10 and the chrominance signal appearing at the output of processing circuit 12 for supply to a line phosphor type color tube in the usual manner. Choke coil 17 provides a return path to ground for unidirectional current going through unilaterally conductive device 13. Filter 15 may be designed to pass signals in a band from 0 to 0.6 mc. which will appear across load resistor 14.

In accordance with the invention unilaterally conductive device 13 is forward-biased by connection of its cathode to a point of negative potential B— through a resistor 18 of suitable magnitude so that unilaterally conductive device 13 is maintained conductive even for chrominance signals whose amplitude is less than the cutoff potential of said device. In the absence of such biasing the impedance of unilaterally conductive device 13 would normally be substantially greater for signals of low amplitude than for signals of higher amplitude, and a substantially higher impedance would be presented in shunt with the chrominance signal channel for signals of low amplitude than for signals of higher amplitude, as a result of which the chrominance channel would have substantially greater gain for signals of low amplitude than for signals of higher amplitude. Hence noise signals traversing said channel would be amplified to a greater extent at low chrominance signal levels than at higher chrominance signal levels. For the reasons hereinafter set forth this is very undesirable.

By forward-biasing the unilaterally conductive device 13 so as to maintain it conductive even for very low amplitude chrominance signals this difficulty is avoided. More particularly the bias may be so selected that the impedance presented by a unilaterally conductive device 13 is less for chrominance signals of low level than it is for chrominance signals of higher level, thereby reducing the gain of the chrominance signal channel for low amplitude chrominance signals when the receiver is most susceptible to noise disturbances.

While the invention has been described with reference to a single embodiment it will be understood that it is susceptible of application in various forms which will occur to those skilled in the art, and the scope of the invention is limited only by the appended claims.

I claim:

1. In combination:

(a) first means for supplying a first signal representative of the luminance component of a color television signal, (b) second means for supplying a second signal representative of the chrominance component of said color television signal, (c) third means for deriving from said second signal a third signal of unidirectional form whose amplitude varies with variations in the amplitude of said second signal, said third means arranged to reduce the amplitude of said second signal in inverse proportion to the amplitude thereof, and (d) fourth means for combining said first, second, and third signals.

2. The combination of claim 1 wherein said third means comprises a unidirectionally conductive device.

3. The combination of claim 2 wherein said unidirectionally conductive device is connected in shunt with the path of said second signal and said device is biased to be conductive irrespective of the amplitude of said second signal.

4. The combination of claim 3 wherein said unidirectionally conductive device is a diode, the anode terminal of which is connected to the output of said second means, the cathode terminal of which is connected:

(a) to an impedance connected to reference potential, (b) to an impedance connected to a source of negative potential, and (c) to the input of said fourth means.

5. In a color television receiver of the type wherein a chrominance signal is combined with a luminance signal and a diode circuit is connected in shunt with the path of said chrominance signal for deriving therefrom a unidirectional signal also to be combined with said luminance signal to reduce color desaturation in the reproduced image, an improvement for minimizing the effects of noise in said chrominance signal, comprising: means for biasing said diode circuit to attenuate said chrominance signal more at low levels thereof than at high levels thereof.

6. The receiver of claim 5 wherein said means for biasing comprises a negative voltage source connected to the cathode of said diode.

7. In the combinaton comprising:

(a) first means for supplying a first signal representative of the luminosity of a scene, (b) second means for supplying a second signal representative of the chromaticity of said scene, (c) third means, including a unidirectionally conductive device, for deriving from said second signal a unidirectional third signal whose amplitude varies with variations in the amplitude of said second signal, and (d) fourth means for combining said first, second, and third signals, an improvement comprising:

(e) fifth means for causing said third means to attenuate said second signal, the amount of attenuation being greater when the amplitude of said second signal is relatively low than when the amplitude thereof is relatively high.

8. The invention of claim 7 wherein said fifth means comprises means for causing said unidirectionally conductive device to be forward biased irrespective of the magnitude of said second signal.

References Cited by the Examiner

UNITED STATES PATENTS

| | | | |
|---|---|---|---|
| 2,752,417 | 6/1956 | Pritchard | 178—5.4 |
| 2,789,156 | 4/1957 | Arneson | 178—5.4 |
| 2,927,151 | 3/1960 | Loughran | 178—5.4 |
| 2,946,845 | 7/1960 | Pickholtz et al. | 178—5.4 |
| 2,969,426 | 1/1961 | Moulton | 178—5.4 |

DAVID G. REDINBAUCH, *Primary Examiner.*

ROBERT SEGAL, STEPHEN W. CAPELLI, *Examiners.*